(12) United States Patent
Frusco

(10) Patent No.: US 7,381,907 B1
(45) Date of Patent: Jun. 3, 2008

(54) ELECTRICAL PANEL BOX

(76) Inventor: Louis J. Frusco, 20 Herkimer Ct., Barnegat, NJ (US) 08005

(*) Notice: Subject to any disclaimer, the term of this patent is extended or adjusted under 35 U.S.C. 154(b) by 0 days.

(21) Appl. No.: 11/711,916

(22) Filed: Feb. 28, 2007

(51) Int. Cl.
H02G 3/08 (2006.01)

(52) U.S. Cl. ............ 174/481; 174/50; 174/53; 174/500; 220/3.2; 220/3.3; 220/4.02; 361/659; 361/667

(58) Field of Classification Search .......... 174/480, 174/481, 50, 53, 57, 58, 500; 220/3.2–3.9, 220/4.02; 439/535; 248/906; 361/600, 361/601, 646, 659, 667, 616
See application file for complete search history.

(56) References Cited

U.S. PATENT DOCUMENTS

| | | | | |
|---|---|---|---|---|
| 1,342,545 A | * | 6/1920 | Krantz | 361/646 |
| 1,729,877 A | * | 10/1929 | Jennigs | 361/646 |
| 3,584,136 A | * | 6/1971 | Robert | 174/53 |
| 3,618,804 A | * | 11/1971 | Krause | 220/3.8 |
| 4,517,623 A | * | 5/1985 | Barner et al. | 220/3.8 |
| 5,011,033 A | * | 4/1991 | Roth | 220/3.8 |
| 5,272,279 A | * | 12/1993 | Filshie | 174/50 |
| 5,663,525 A | * | 9/1997 | Newman | 174/50 |
| 5,886,868 A | * | 3/1999 | White et al. | 361/652 |
| 7,075,003 B2 | * | 7/2006 | Johnson et al. | 174/50 |

* cited by examiner

*Primary Examiner*—Angel R Estrada
(74) *Attorney, Agent, or Firm*—Clifford G. Frayne

(57) ABSTRACT

An electrical panel box which includes a cavity defined by a back face, two opposing side walls, a top wall and a bottom wall and a front face extending beyond the periphery of the side walls and top and bottom walls for securing the electrical panel box in a wall, the front face being fitted with mounting brackets on either its top edge or its bottom edge or both, the mounting bracket having secured thereto an access plate which allows the electrician access to the region directly above the top wall of the housing or the below the bottom wall of the housing so as to permit snaking of additional electrical conduit, cable or wires without having concern for contacting the main electrical conduit into the house thus causing a short or a flash and possible injury to the electrician.

11 Claims, 4 Drawing Sheets

ELECTRICAL PANEL BOX

BACKGROUND OF THE INVENTION

1. Field of the Invention

The present invention is related to electrical circuitry, and in particular, the electrical panel box from which electrical cables distribute power to various locations within a residence, commercial building or industrial complex.

2. Description of the Prior Art

All residential, commercial locations, and industrial locations have at least one electrical panel box located within the structure which serves as the load center to distribute via electrical conduit, cable, or wires power to various locations within the structure. These electrical panel boxes or load centers are commonly referred to in a residential setting as the breaker panel box as it allows the home owner to disrupt electrical power to various portions of the residence. The box also serves as a safety feature in that a surge or overload will cause the breakers to engage so as to prevent damage from such surge or overload. The panels of the prior art and the Applicant's electrical panel box will hereafter be described with respect to a residential dwelling.

The typical electrical panel is constructed of metal and is designed to be secured between adjacent vertical wall studs in a residential dwelling. It has a front door which opens and allows the home owner access to the breaker switches.

Typically in new construction, once the residence is framed, the electrician can come in, locate and install the electrical panel, and then run conduit, cable or wires from the electrical panel through the walls to the various electrical outlets and appliances. Since the wall board and ceiling board has not yet been installed, the electrician can run the conduit, cable or wires very easily by just drilling holes through the studs so the conduit, cable or wire may be installed.

The problem which the electrician faces is when a homeowner adds new electrical requirements to an existing residence. These new electrical requirements could include an addition to the residence, a swimming pool, or a hot tub or spa. At this time, all of the walls and ceilings of the residence are covered with wall board or plaster board, and the electrician must therefore snake the conduit, cable or wires from or to the electrical panel box through the walls to the location which requires additional outlets or a source of electrical power. He accomplishes this by opening the electrical panel and attempts to snake the new wiring either upwardly or downwardly to the desired location. As the electrician is doing this, the electrical panel box is hot in that the main electricity cable or conduit from the street enters the house through the electric meter and is then directed to the electrical panel box for distribution within the house. Since the electrician is attempting to snake the conduit, cable or wire with a metal snake through the top or bottom of the electrical panel, the electrician must be very careful not to make contact with a hot location such as to cause a short or a flash which could cause serious injury to the electrician.

Applicant's invention can be incorporated on new construction to provide for a safer means for accomplishing the tasks described, or can be created in kit form to modify electrical panel boxes already in place if and when additional wiring or power is required.

OBJECTS OF THE INVENTION

An object of the present invention is to provide for a novel electrical panel box which incorporates a removable front plate which allows access to the top or the bottom of the electrical panel box for the snaking of additional electrical conduit, cable or wires.

A still further object of the present invention is to provide for a novel electrical panel box having an additional access panel which allows access to the top portion or bottom portion of the electrical panel box for the snaking of additional electrical conduit, cable or wires which provides safety to the electrician and prevents the possibility of shorts and flashes.

A still further object of the present invention is to provide for a novel bracket and access panel which can be installed with existing electrical panel boxes which allows the electrician access to the top portion or bottom portion of the electrical panel box and provides for safety factors in that it eliminates the possibility of shorts or flashes and injury to the electrician when snaking new conduit, cable or wires.

SUMMARY OF THE INVENTION

An electrical panel box which includes a cavity defined by a back face, two opposing side walls, a top wall and a bottom wall and a front face extending beyond the periphery of the side walls and top and bottom walls for securing the electrical panel box in a wall, the front face being fitted with mounting brackets on either its top edge or its bottom edge or both, the mounting bracket having secured thereto an access plate which allows the electrician access to the region directly above the top wall of the housing or the below the bottom wall of the housing so as to permit snaking of additional electrical conduit, cable or wires without having concern for contacting the main electrical conduit into the house thus causing a short or a flash and possible injury to the electrician.

BRIEF DESCRIPTION OF THE DRAWINGS

These and other objects of the present invention will become apparent, particularly when taken in light of the following illustrations wherein.

DETAILED DESCRIPTION OF THE INVENTION

Figure 1:
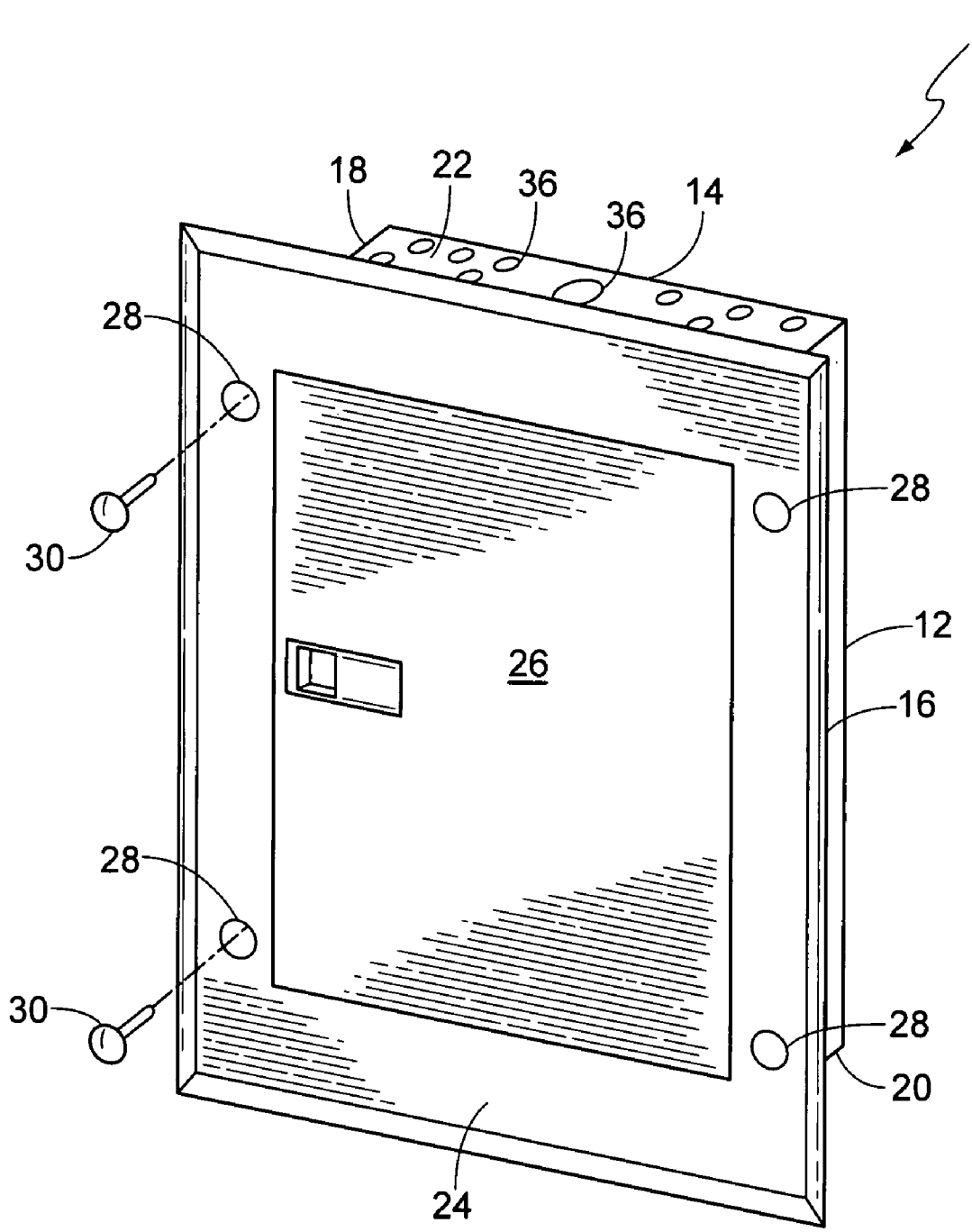
FIG. 1 is a perspective view of an electrical panel of the prior art.
Figure 2:
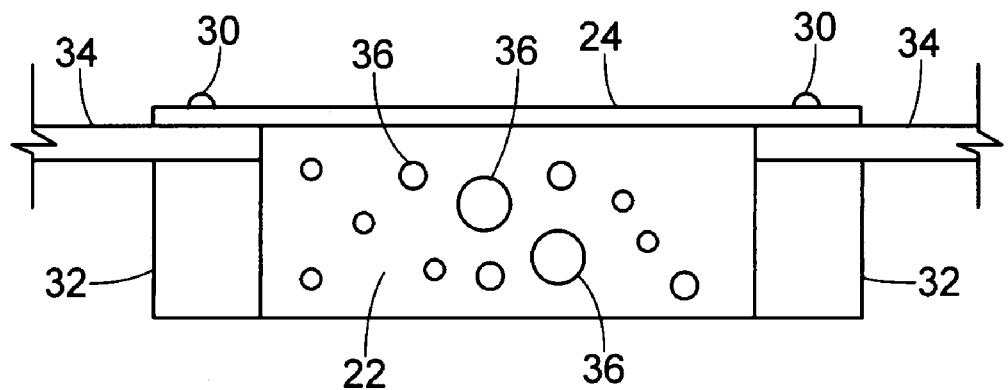
FIG. 2 is a top view of an installed electrical panel of the prior art.
Figure 3:
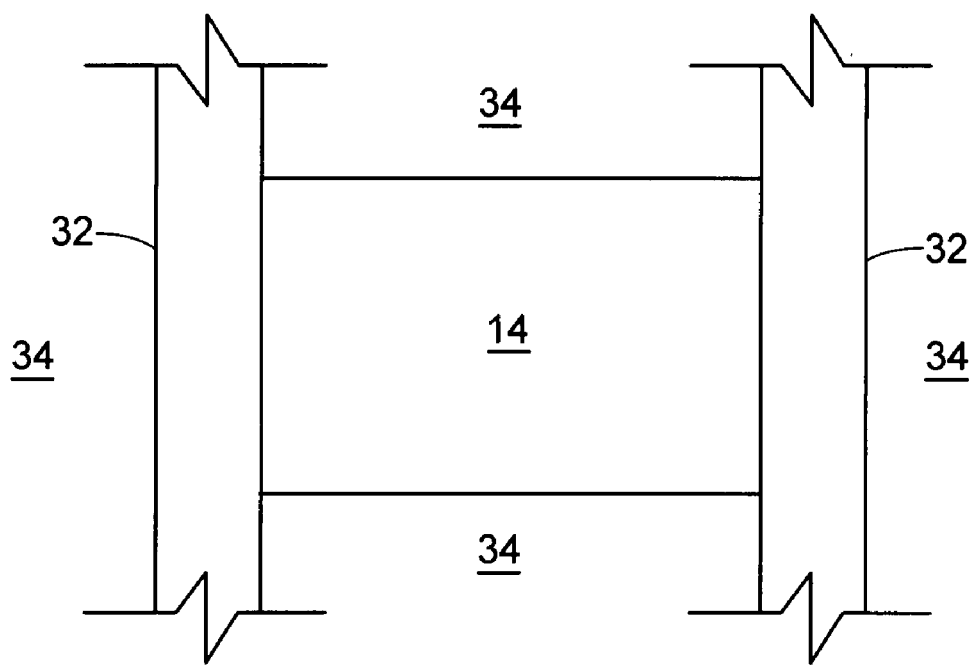
FIG. 3 is a rear view of an electrical panel of the prior art.

FIG. 1 is a perspective view of a typical electrical panel box 10 of the prior art. Electrical panel box 10 is comprised of a housing portion 12 defined by a back wall 14, opposing side walls 16 and 18, a bottom wall 20 and a top wall 22. A front wall 24 is secured to the housing member 12, front wall 24 having a hinged door 26 allowing access to the interior of the housing where after fully wired, the various circuit breakers would be located. Front wall 24 extends beyond the periphery of housing member 12 and is formed with a plurality of apertures 28 for the receipt of threaded fasteners 30. The housing member 12 is dimensioned from side wall 16 to side wall 18 to fit snugly between adjacent vertical wall studs 32 and be secured thereto (See FIGS. 2 and 3). The extended periphery of front face 24 is dimensioned such that threaded fasteners 30 passing through the apertures 28 will engage into the adjacent wall 34 thereby securing the electrical panel box.

FIG. 1 also illustrates that the top wall of the housing member is formed with embossed punch outs 36 which can be selectively knocked out or removed by the electrician to allow for the passage of electrical conduit, cable or wires. One of the embossed punch outs 36 would be removed to allow for the insertion of electrical conduit coming from the electric meter on the residence. This electrical conduit would provide the power to all of the other electrical conduits emanating from the electrical panel box 10 and being directed to various parts of the residence in order to provide power for lights, electrical receptacles, and appliances. In that regard there is always power to the electrical panel box 10, but the power to the various portions of the residence can be interrupted by the breaker switches (not shown).

It should also be noted that the bottom wall 20 of housing member 12 is also formed with embossed punch outs 36 so that the electrical conduit can emanate from both the top wall 22 and the bottom wall 20 if necessary depending upon the electrical circuitry design for the residence.

When the electrical panel box is initially positioned in the residence, the interior walls of the residence would not yet have been covered with plaster board or wall panels. As such it would be very easy for the electrician to run conduit, cable and wires from the electrical panel box 10 through the embossed punch outs 36 to various portions of the residence. However, when the residence is completed, the plaster board or wall paneling abuts the top wall 22 and bottom wall 20 of housing member 12 and abuts the vertical periphery of the front face 24.

At this point, if the home owner requires additional electrical power to another portion of the residence for whatever reason, e.g. expansion, addition of a spa, addition of a pool, the electrician must now snake a new electrical conduit, cable or wire through one of the unused embossed punch outs 36 in the top 22 or bottom 20 of the housing member 12 in order to thread that conduit through the encapsulated walls to the desired location. In this regard the snake is a thin metal wire and care must be taken because the electrical service to the electrical panel box 10 from the outside meter is on or hot and if the electrician makes contact with the metal snake, a short or a flash could occur which could serious injure the electrical installer.

Figure 4:
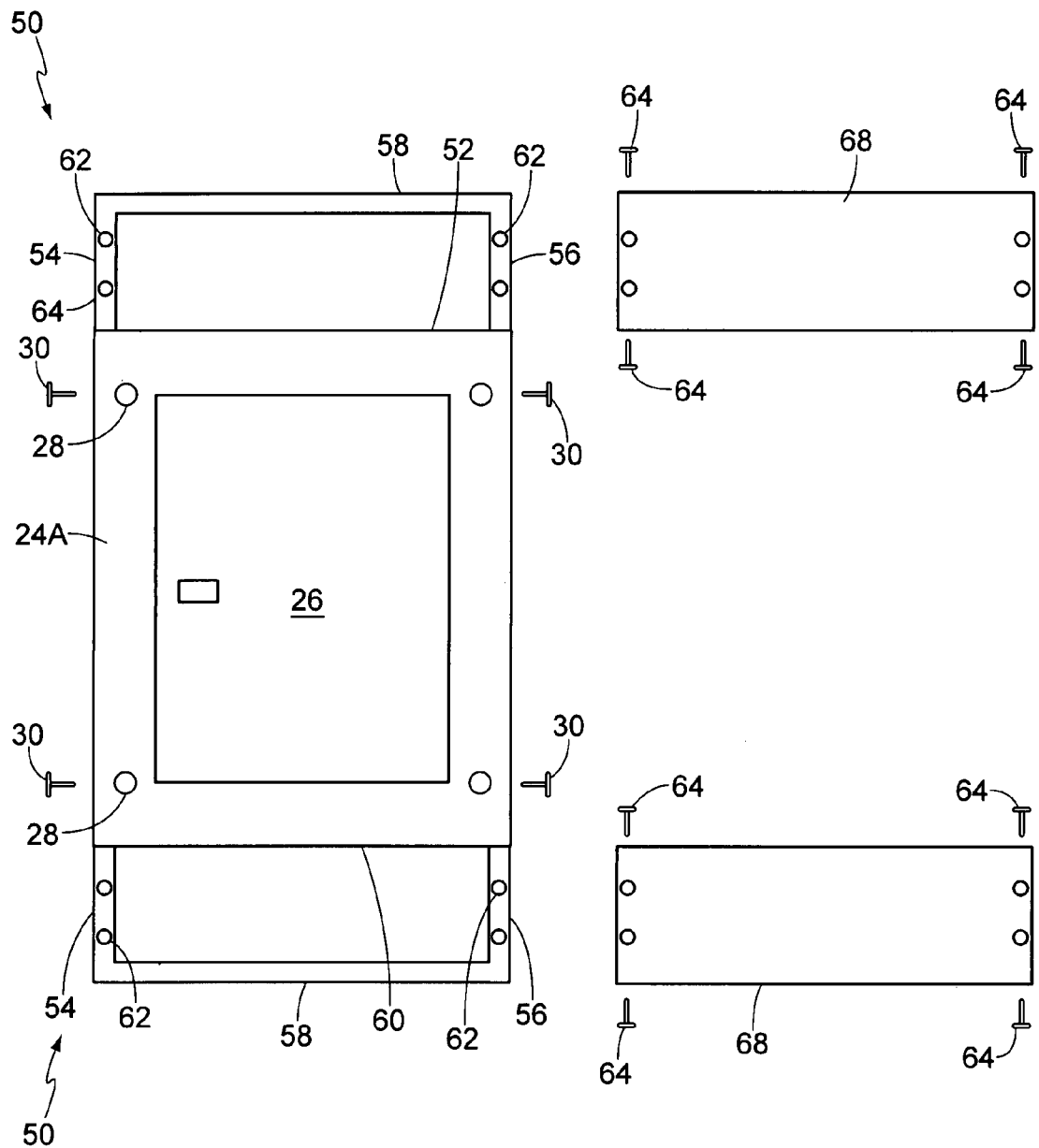
FIG. 4 is a front exploded view of an electrical panel of the present invention incorporating an extended mounting bracket and access plate.
Figure 5:
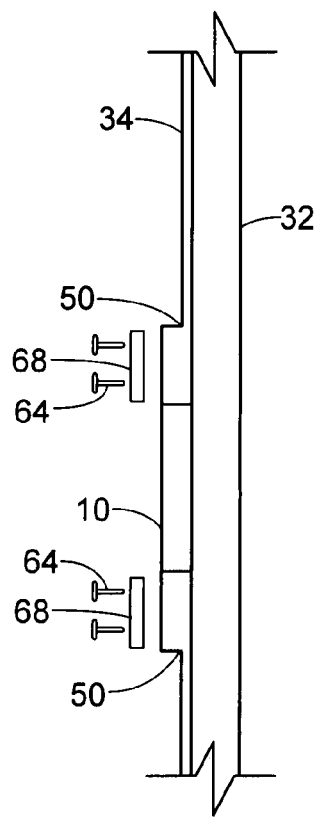
FIG. 5 is a side view of the electrical panel of the present invention.

FIG. 4 is a front exploded view of Applicant's electrical panel box 10A and FIG. 5 is a side view. The housing member 12 would be the same as that of the prior art. The main modifications come with respect to the front face 24A of the electrical panel box 10A. The front face 24A would have a unitary integrated bracket 50 extending upwardly from the top edge 52 of front face 24A. The integrated unitary bracket would be comprised of two vertical legs 54 and 56 and a horizontal leg 58. Depending upon the electrical circuitry design of the residence, an identical unitary integrated bracket 50A could extend downwardly from the lower edge 60 of front face 24A. In this configuration, the plaster board or wall board would be cut such that it coincided with the inner edge of the vertical legs 54 and 56 and the inner edge of horizontal leg 58 of the integrated unitary bracket 50. The unitary integrated bracket 50 could have a plurality of apertures 62 there through for the receipt of threaded fasteners 64 in order to secure an access plate 68 thereto. This procedure could be utilized with respect to unitary integrated bracket 50 extending upwardly from the top edge 52 of the front face 24A, or for an integrated unitary bracket 50 extending downwardly from the lower edge 60 of the front face or both 24.

In this configuration, the electrical panel box 10A is secured between two adjacent vertical wall studs 32 and to the wall via threaded fasteners 30 and through apertures 28. The integrated unitary bracket 50 is also secured to the wall via fasteners 64. At this step it can be seen that the electrical panel box 10A is secured to the wall and the brackets 50 are secured to the wall, and the wall board is secured, thus defining an opening 70 above the top wall 22 of the housing member 12 and/or if desired, an opening 72 below the bottom wall 20 of the housing member 12.

This opening 70 or 72 allows the electrician to remove an access panel 68 and to utilize the metal snake to snake electrical conduit upwardly or downwardly without having concern for the hot wire coming into the electrical panel box 10A from the exterior electric meter. The access panel 68 may be secured by threaded fasteners or could be in the form of a hinged door similar to the door 26 of the panel box which could be pivoted so as to allow access. From a safety standpoint, this allows the electrician to work more safely and more quickly. The design does not detract from the aesthetics of the room in which the electrical panel box 10A is located and maintains the integrity of the electrical panel box 10A and the conduit entering and emanating there from, but when necessary, allows the electrician quick and easy access to either the space above or below the electrical panel box 10A for the snaking of electrical conduit, cable or wires.

Figure 6:
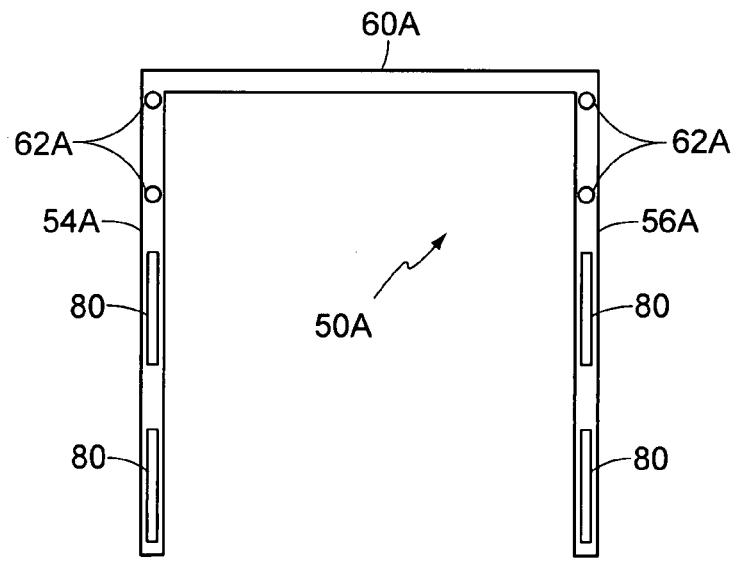
FIG. 6 is a front view of Applicant's invention in kit form in order to refit existing installed electrical panel boxes.
Figure 6:
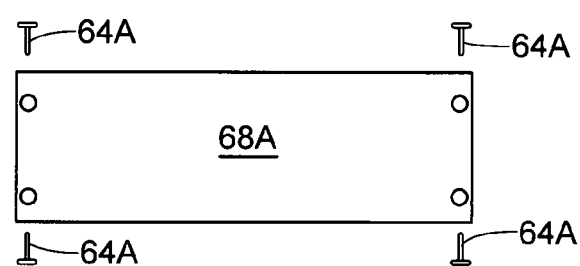

FIG. 6 illustrates the bracket and access panel mount 50 and 68 respectively when it is utilized as an aftermarket item in converting an electrical panel box 10 of the prior art so as to allow the electrician access to the space above or below the panel box.

Bracket 50A is formed of two vertical legs 54A and 56A and a horizontal leg 60A. It has a first set of apertures 62A identical to those apertures on bracket 50 for receipt of a threaded securing means 64A to secure the access plates 68A to the bracket.

Proximate the lower portion of legs 54A and 56A are a further series of apertures 80 which may be in the form of a circular aperture or a slot. Apertures 80 are designed to allow the legs 54A and 56A of bracket 50A to extend downwardly behind the face plate 24 of an existing electrical panel box 10. Apertures 80 are designed to accommodate threaded apertures 30 which secure face plate 24 to the wall 35. The reason for a plurality of apertures or slots is to accommodate electrical panel boxes from a variety of manufacturers in which the apertures on the face plate oftentimes vary in their distance from the top edge of the face plate. In this configuration, the user would remove the top most threaded fasteners 30 from the face plate 24. The user would then insert the legs 54A and 56A of bracket 50A behind the face plate and slide them down until the apertures or slots 80 on the lower portion of legs 54A and 56A align with the top most apertures on the face plate 24. Fasteners 30 would then be repositioned now passing through the front face 24 of the electrical panel box 10, and through the apertures and legs 54A and 56A of bracket 50A. The user would then take a cutting knife and cut out or remove the wallboard or plaster board in the space defined by the top edge of the front face 24 and the interior edges of legs 54A and 56A and cross leg 58A. The user now has an access area to the top or bottom portion of the electrical panel box 10. The user would then take the preformed and predrilled access plate 68A and secure through the apertures 62A into the wall 35. The access plate 68A now serves as a safety guard preventing anyone from accidentally placing their hand into this void, but allow for its removal for a trained electrician to have access to this space to safely snake conduit, cable or wire.

While the present invention has been described with respect to the exemplary embodiments thereof, it will be recognized by those of ordinary skill in the art that many modifications or changes can be achieved without departing from the spirit and scope of the invention. Therefore it is manifestly intended that the invention be limited only by the scope of the claims and the equivalence thereof.

I claim:

1. A recessed electrical panel box having a cavity defined by a back face, two opposing side walls, a top wall, and a bottom wall, and a front face, said front face having a plurality of apertures for receipt of a securing means to secure said electrical panel box in a recess to a wall, said front face and said side walls of said electrical panel box having a plurality of mounting brackets extending vertically there from, said mounting brackets having secured thereto an access plate, said access plate allowing an electrician access to an interior region directly above the top wall of the recessed electrical panel box or directly below the bottom wall of the recessed electrical panel box so as permit snaking of additional electrical conduit without the possibility of contacting a live main electrical conduit secured within the electrical panel box from an exterior electrical meter such as to cause a short, flash or possible injury.

2. The electrical panel box in accordance with claim 1 wherein said mounting brackets comprise two vertical legs and a cross member.

3. The electrical panel box in accordance with claim 2 wherein said mounting brackets extend upwardly from said panel box and downwardly from said panel box.

4. The electrical panel box in accordance with claim 2 wherein said mounting brackets are integral and unitary with said front face and said side walls of said electrical panel box.

5. The electrical panel box in accordance with claim 2 wherein said mounting brackets are affixable to existing installed panel boxes by means of slotted apertures in said vertical legs to accommodate alignment with said plurality of apertures in said front face of said electrical panel box.

6. The electrical panel box in accordance with claim 1 wherein said top wall and said bottom wall are formed with punch out apertures for the passage of electrical wiring there through.

7. An improved recessed electrical panel box for residential, commercial or industrial use for the protection of an electrical worker and reduction of possible shorts, sparks, or injury when rewiring or snaking additional wires to said recessed electrical panel box, said recessed electrical panel box having a top wall, a bottom wall, opposing side walls, a rear wall, and a front face defining a cavity for receipt of a breaker panel and access door for controlling distribution of electrical power via electrical cables, said electrical cables emanating from said breaker panel and said recessed electrical panel box via punch out apertures in said top wall and/or said bottom wall, said exterior power to said breaker panel supplied by an electrical cable entering said breaker panel via a punch out aperture in either said bottom wall or said top wall, said improvement in said electrical panel box comprising:

a plurality of mounting brackets extending vertically from said recessed electrical panel box, said mounting brackets having secured thereto an access plate, said access plate allowing an electrician access to an interior region directly above the top wall of said recessed electrical panel box or directly below the bottom wall of said recessed electrical panel box so as to permit rewiring or snaking of additional electrical conduit without the possibility of contacting said exterior power electrical cable such as to cause a short, flash, or possible injury.

8. The improved electrical panel box of claim 7 wherein said mounting brackets comprise two vertical legs and a cross member.

9. The improved electrical panel box of claim 8 wherein said mounting brackets extend upwardly from said panel box and downwardly from said panel box.

10. The improved electrical panel box in accordance with claim 8 wherein said mounting brackets are integral and unitary with said electrical panel box.

11. The improved electrical panel box in accordance with claim 8 wherein said mounting brackets are affixable to existing installed panel boxes by means of slotted apertures in said vertical legs to accommodate alignment with said plurality of apertures in said front face of said electrical panel box.

* * * * *